US010678057B2

(12) United States Patent
Lu et al.

(10) Patent No.: US 10,678,057 B2
(45) Date of Patent: Jun. 9, 2020

(54) LIQUID CRYSTAL CELLS FOR POLARIZATION ROTATION

(71) Applicant: Facebook Technologies, LLC, Menlo Park, CA (US)

(72) Inventors: Lu Lu, Seattle, WA (US); Fenglin Peng, Orlando, FL (US); Mengfei Wang, Seattle, WA (US); Wai Sze Tiffany Lam, Redmond, WA (US); Scott Charles McEldowney, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/969,007

(22) Filed: May 2, 2018

(65) Prior Publication Data
US 2018/0335630 A1  Nov. 22, 2018

Related U.S. Application Data

(60) Provisional application No. 62/507,723, filed on May 17, 2017, provisional application No. 62/571,147, filed on Oct. 11, 2017.

(51) Int. Cl.
*G02F 1/1347* (2006.01)
*G02F 1/13363* (2006.01)
*G02B 27/01* (2006.01)
*G02F 1/1343* (2006.01)
*G02B 5/30* (2006.01)
(Continued)

(52) U.S. Cl.
CPC ....... *G02B 27/0172* (2013.01); *G02B 5/3083* (2013.01); *G02B 27/0093* (2013.01);
(Continued)

(58) Field of Classification Search
CPC ............. G02F 1/13363; G02F 2413/06; G02F 1/1347; G02F 1/133634;
(Continued)

(56) References Cited

U.S. PATENT DOCUMENTS 4,870,357 A     9/1989  Young et al.
4,906,073 A *   3/1990  Hunahata ............ G02F 1/13363
                                                349/101
(Continued)

FOREIGN PATENT DOCUMENTS

JP   2003-295152 A   10/2003
JP   2009-500231 A    1/2009
JP   2013-190726 A    9/2013

OTHER PUBLICATIONS

European Extended Search Report, European Application No. 18172706.6, dated Aug. 14, 2018, 9 pages.
(Continued)

*Primary Examiner* — Paisley L Wilson
*Assistant Examiner* — Mariam Qureshi
(74) *Attorney, Agent, or Firm* — Millburn IP PLLC

(57) ABSTRACT

An optical element comprising a stacked liquid crystal (LC) structure for rotating polarization (e.g., handedness) of an incident circularly polarized light over a broad wavelength and incident angle for head-mounted displays (HMD)s display application is proposed. The stacked LC structure has a dual cell structures, which includes at least a first LC cell and a second LC cell, and the stacked LC structure rotates the polarized light for a broad band of light (e.g., visible spectrum) over a given field a view. The performance of designed dual LC cells structures may be optimized for narrow band wavelength and a narrow incident angle for different application cases.

20 Claims, 10 Drawing Sheets

(51) Int. Cl.
*G02B 27/00* (2006.01)
*G02C 7/10* (2006.01)
*G02F 1/133* (2006.01)
*G02F 1/139* (2006.01)
*G02F 1/1333* (2006.01)

(52) U.S. Cl.
CPC ......... *G02C 7/101* (2013.01); *G02F 1/13439* (2013.01); *G02F 1/13471* (2013.01); *G02B 2027/0118* (2013.01); *G02B 2027/0178* (2013.01); *G02F 1/1395* (2013.01); *G02F 1/13306* (2013.01); *G02F 1/13363* (2013.01); *G02F 2001/133302* (2013.01); *G02F 2203/04* (2013.01); *G02F 2413/04* (2013.01); *G02F 2413/05* (2013.01); *G02F 2413/06* (2013.01); *G02F 2413/07* (2013.01)

(58) Field of Classification Search
CPC ..... G02F 2001/133631; G02F 2413/01; G02F 2413/00; G02F 2413/12
See application file for complete search history.

(56) References Cited

U.S. PATENT DOCUMENTS

| | | | |
|---|---|---|---|
| 5,870,159 | A | 2/1999 | Sharp |
| 6,028,656 | A * | 2/2000 | Buhrer ................ G02F 1/13471 349/117 |
| 2004/0207787 | A1 | 10/2004 | Nakamura et al. |
| 2009/0231517 | A1* | 9/2009 | Shiraogawa ...... G02F 1/133632 349/75 |
| 2012/0044431 | A1* | 2/2012 | Osterman ........... G02F 1/13471 349/15 |
| 2013/0027656 | A1* | 1/2013 | Escuti ................. G02B 5/3083 349/193 |
| 2016/0282639 | A1* | 9/2016 | von und zu Liechtenstein .......... G01J 4/00 |

OTHER PUBLICATIONS

PCT International Search Report, PCT Application No. PCT/US2018/030722, dated Sep. 14, 2018, 20 pages.

* cited by examiner

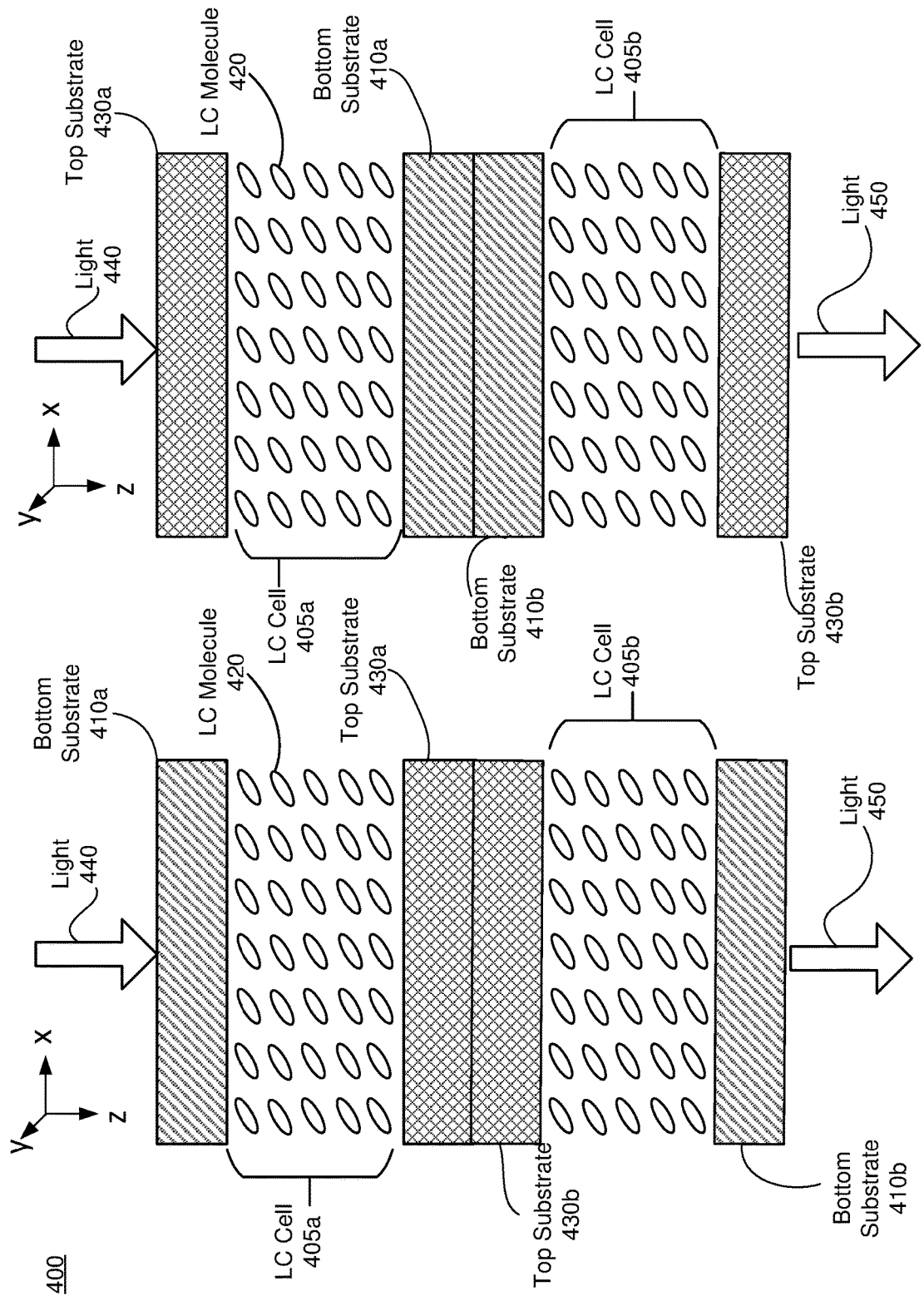

US 10,678,057 B2

LIQUID CRYSTAL CELLS FOR POLARIZATION ROTATION

CROSS REFERENCE TO RELATED APPLICATION

This application claims the benefit of provisional U.S. Patent Application No. 62/507,723, filed May 17, 2017 and U.S. Provisional Application No. 62/571,147, filed Oct. 11, 2017. The foregoing applications are incorporated by reference herein.

BACKGROUND

The present disclosure generally relates to adaptive visual images from electronic displays, and specifically to minimizing the birefringent dispersion of birefringent optical components.

A near-eye display (NED), augmented reality (AR) headsets, and virtual reality (VR) headsets can be used to simulate virtual, augmented, and mixed reality environments. For example, stereoscopic images can be displayed on an electronic display inside the headset to simulate the illusion of depth. Head tracking sensors can be used to estimate what portion of the virtual environment is being viewed by the user. Such a simulation, however, can cause visual fatigue and nausea resulting from an inability of existing headsets to correctly render or otherwise compensate for vergence and accommodation conflicts.

To create a comfortable viewing experience, the virtual image generated by the headset needs to be generated at the right distance from the eye. One or more optical components such as liquid crystal cells may be used to achieve this. However, conventional liquid crystal displays are birefringent.

SUMMARY

A stacked liquid crystal (LC) integrated into a display of a near-eye display (NED) is presented herein. The NED may be part of an artificial reality system. The stacked LC structure may be used as a polarization rotator. Here the stacked LC structure includes one or more transparent substrates and two LC cells (e.g., film type). Broadband light incident on a stacked LC structure exits the stacked LC structure as broadband light after propagating through the one or more substrates and the two LC cells. The stacked LC structure is configured to rotate a polarization of the incident broadband light. That is, the incident broadband light exits the stacked LC structure as a broadband light whose polarization has been rotated relative to a polarization of the incident broadband light. For example, the incident broadband light is right hand circularly polarized (RCP) while the broadband light exiting the stacked LC structure is left hand circularly polarized (LCP). In an embodiment, one of the two LC cells comprising the stacked LC structure is driven with an external power supply to change the total phase retardation of the stacked LC structure while the other LC cell is used as a compensator. In some embodiments, the other LC cell may also act as a backup LC cell for driving the system. In some embodiments, both LC cells are driven with an external power supply to change the total phase retardation.

BRIEF DESCRIPTION OF THE DRAWINGS

FIG. 4A is a design of a stacked LC structure that includes two LC cells with antiparallel alignment, in accordance with an embodiment.

FIG. 4B is the design of a stacked LC structure depicted in FIG. 4A in an alternate configuration, in accordance with an embodiment.

Figure 1:
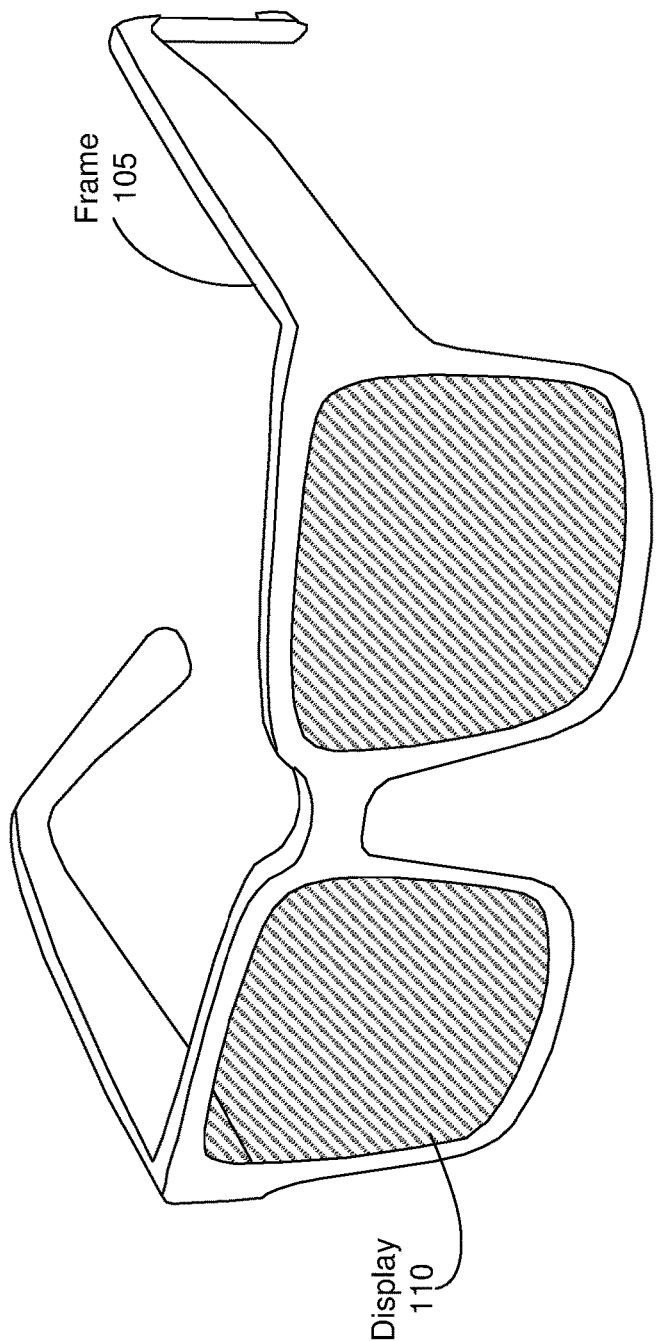
FIG. 1 is a diagram of a near-eye display (NED), in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Configuration Overview

A near eye display (NED) includes one or more display assemblies (e.g., one for each lens) configured to apply an amount of phase adjustment to a polarization of a broadband light as it propagates through the display assemblies. The amount of phase adjustment is such a polarization of the broadband light is rotated. In an embodiment, the display assembly includes two liquid crystal (LC) cells arranged into a stacked LC structure. As broadband light passes through each of the plurality of LC cells, each LC cell applies an amount of phase adjustment to a polarization of the broadband light. As used herein, phase adjustment refers to a change in a phase shift between polarization vector components of light and/or a rotation of polarization vector components. Note that the phase shift may be zero, and the change in phase shift may be to make it non-zero or vice versa. Accordingly, the amount of phase adjustment may cause, e.g., rotation of linear polarized light (e.g., rotates by 90 degrees), a change in handedness for circularly polarized light (e.g., right to left or vice versa), etc. In some embodiments, the total amount of phase adjustment acts to rotate the polarization of the broadband light (e.g., rotate linear polarized light by some amount). Broadband light may include, e.g., the entire visible spectrum. In some embodiments, the display assembly adjusts the amount of phase adjustment applied to a polarization of the broad band light in accordance with instructions from the NED to, for example, to mitigate vergence-accommodation conflict of the eyes of a user.

In an embodiment, each stacked LC structure includes two LC cells such that the two LC cells have an antiparallel or a perpendicular alignment to one another. The LC cells within a stacked LC structure may be in an active or a passive state and are configured to contribute some amount of phase adjustment to light emitted by the display assembly. In some embodiments, each of the plurality of LC structures additionally comprises one or more polarization rotators. The propagation of light through a first LC cell in the stacked LC structure may result in the formation of a ghost image. The stacked LC structure is configured such that the light exiting the first LC cell propagates through a second LC cell. The alignment of the second LC cell with respect to the first LC cell reduces a field of view of the ghost image. In one or more embodiments, the field of view of the stacked LC structure is a range of 60 to 120 degrees. Accordingly, the stacked LC structure is wavelength independent for a range of wavelengths inclusive of the broadband light over a broad range of incident angle.

FIG. 1 is a diagram of a NED 100, in accordance with an embodiment. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as an artificial reality NED. In some embodiments, the NED 100 may augment views of a physical, real-world environment with computer-generated elements (e.g., images, video, sound, etc.).

The NED 100 shown in FIG. 1 includes a frame 105 and a display 110. The frame 105 includes one or more optical elements which together display media to users. The display 110 is configured for users to see the content presented by the NED 100. The display 110 receives image light from a local area being viewed by a user. In an embodiment the display 110 includes one or more optical elements configured to adjust the field of view and adjust the accommodation. The display 110 is further described below in conjunction with FIG. 2. In some embodiments, the NED 100 may also be referred to as a HMD.

Figure 2:
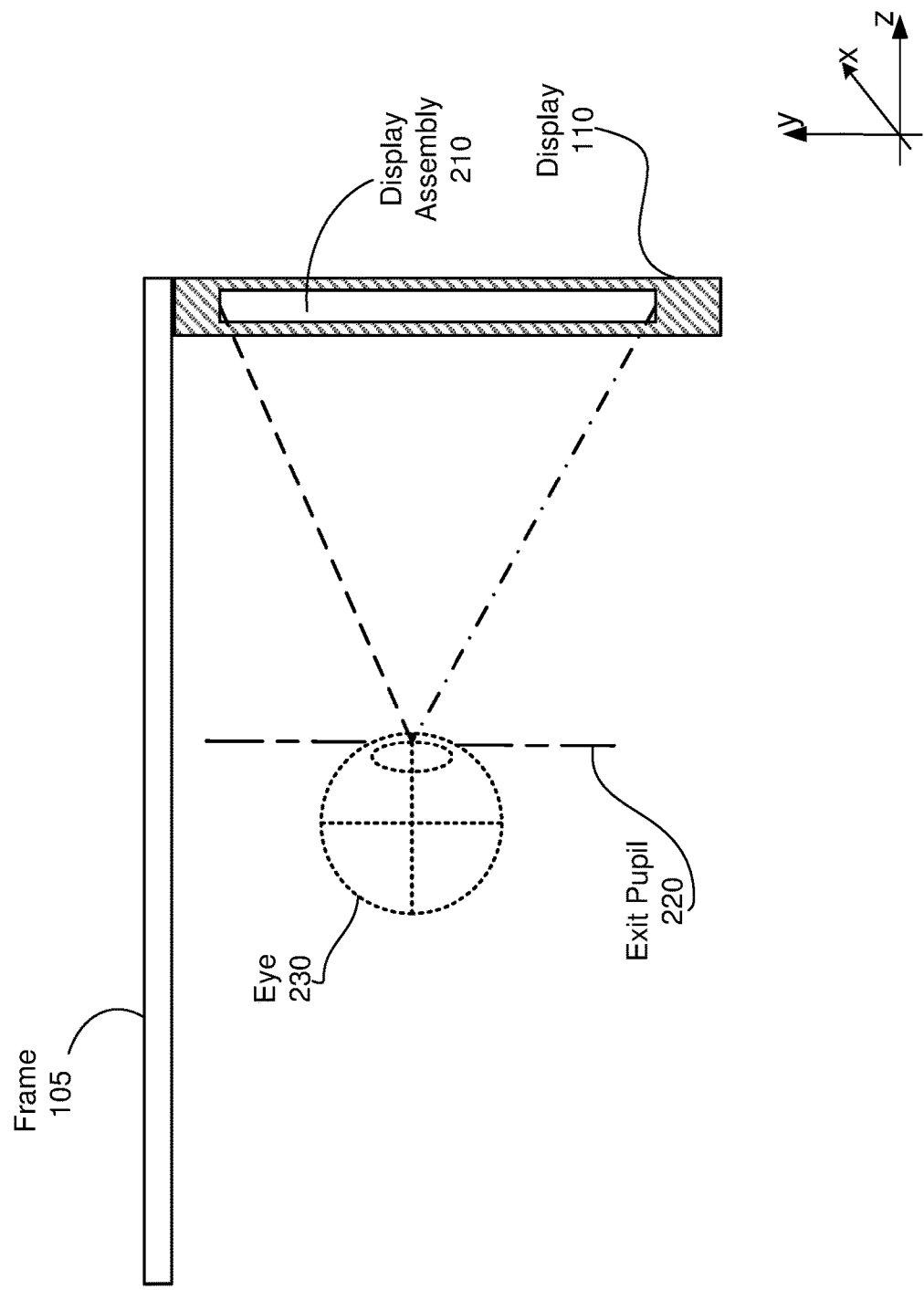
FIG. 2 is a cross-section of an eyewear of the NED in FIG. 1, in accordance with an embodiment.

FIG. 2 is a cross section 200 of an eyewear of the NED 100 illustrated in FIG. 1, in accordance with an embodiment. The cross section 200 includes at least one display assembly 210 integrated into the display 110, and an exit pupil 220. The exit pupil 220 is a location where an eye 230 is positioned when a user wears the NED 100. In some embodiments, the frame 105 may represent a frame of eye-wear glasses. For purposes of illustration, FIG. 2 shows the cross section 200 associated with a single eye 230 and a single display assembly 210, but in alternative embodiments not shown, another display assembly which is separate from the display assembly 210 shown in FIG. 2, provides image light to another eye 230 of the user.

The display assembly 210 is configured to direct the image light to the eye 230 through the exit pupil 220. In some embodiments, when the NED 100 is configured as an AR NED, the display assembly 210 also directs light from a local area surrounding the NED 100 to the eye 230 through the exit pupil 220. The display assembly 210 may be configured to emit image light at a particular focal distance in accordance with varifocal instructions, e.g., provided from a varifocal module (not shown in FIG. 2). The varifocal module may include one or more LC lenses and be part of an HMD as described in U.S. application Ser. No. 15/693,839, filed Sep. 1, 2017, which is incorporated by reference in its entirety herein. The varifocal module may also be used in other HMDs and/or other applications where polarization of light is rotated over a broad wavelength range and over a broad range of incident angles.

The display assembly 210 may be composed of one or more materials (e.g., plastic, glass, etc.) with one or more refractive indices that effectively minimize the weight and widen a field of view of the NED 100. In alternate configurations, the NED 100 includes one or more optical elements between the display assembly 210 and the eye 230. The optical elements may act to, e.g., correct aberrations in image light emitted from the display assembly 210, magnify image light, perform some other optical adjustment of image light emitted from the display assembly 210, or some combination thereof. The example for optical elements may include an aperture, a Fresnel lens, a convex lens, a concave lens, a diffractive element, a waveguide, a filter, a polarizer, a diffuser, a fiber taper, one or more reflective surfaces, a polarizing reflective surface, a birefringent element, or any other suitable optical element that affects image light emitted from the display assembly 210. In still further embodiments, the display assembly 210 additionally includes liquid crystal lenses including one or more stacked LC structures configured to perform an amount of phase adjustment such that, in the aggregate, the one or more stacked LC structures act to rotate a polarization based on an applied voltage.

Liquid crystal lenses comprise liquid crystals (LCs) arranged into a stacked LC structure. A LC cell may be, e.g., a film type LC cell, a thin-glass type LC cell. An optical mode of the stacked LC structure may be one of an electrically controlled birefringence (ECB) mode, a vertical aligned (VA) mode), a multiple-domain vertical aligned (MVA) mode, a twisted nematic (TN) mode, a super twisted nematic (STN) mode, and an optical compensated (OCB) mode. Details of stacked LC structures are discussed in detail below in conjunction with FIGS. 3-5B. Some specific design examples of stacked LC structures comprising LC cells, including example material properties, are described below in conjunction with FIGS. 7-10.

The stacked LC structure includes a plurality of LC cells that are coupled together in a manner such that an overall amount of phase adjustment to light by the stacked LC structure is tunable. The plurality of LC cells in the stacked LC structure may be active, passive, or some combination thereof. In some embodiments, at least one of the plurality of LC cells is a nematic LC cell, a nematic LC cell with chiral dopants, a chiral LC cell, a uniform lying helix (ULH) LC cell, a ferroelectric LC cell. In other embodiments, the LC cell is an electrically drivable birefringence materials. The phase adjustment of the polarization of light as it propagates through the stacked LC structure may accomplished by controlling the handedness of the polarized light as it moves through the stacked LC structure. In an embodiment, the handedness of polarized light may be controlled via a voltage applied to the plurality of LC cells in the stacked LC structure. In some embodiments, each LC cell within a stacked LC structure is aligned to be perpendicular to an adjacent film type LC cell. In a perpendicular alignment, the average molecular alignment of adjacent LC cells is configured to be orthogonal to one another. In other embodiments, each film type LC cell has an antiparallel alignment to an adjacent LC cell. In an antiparallel alignment, both a first LC and a second LC cell run parallel to one another but with opposite optical alignments. That is, in an antiparallel alignment, the average molecular alignment of the first LC cell is configured to be antiparallel to that of the second LC cell. In still other embodiments, the stacked LC structure comprises a single LC cell with a compensation layer. The embodiments described above are described in detail below in conjunction with FIGS. 3-5B and FIGS. 8A-11B.

In some embodiments, the NED 100 further includes an eye tracker (not shown in FIG. 2) for determining and tracking a position of the eye 230, i.e., an angle and orientation of eye-gaze. Note that information about the position of the eye 230 also includes information about an orientation of the eye 230, i.e., information about user's eye-gaze. Based on the determined and tracked position and orientation of the eye 230, the NED 100 adjusts image light emitted from the display assembly 210. In some embodiments, the NED 100 adjusts focus of the image light and ensures that the image light is in focus at the determined angle of eye-gaze in order to mitigate the vergence-accommodation conflict. Additionally, or alternatively, the NED 100 adjusts resolution of the image light by performing foveated rendering of the image light, based on the position of the eye 230. Additionally, or alternatively, the NED 100 uses the information on a gaze position and orientation to provide contextual awareness for the user's attention, whether on real or virtual content. The eye tracker generally includes an illumination source and an imaging device (camera). In some embodiments, components of the eye tracker are integrated into the display assembly 210. In alternate embodiments, components of the eye tracker are integrated into the frame 105.

Example Stacked LC Structures

Below various designs of stacked LC structures are discussed. The stacked LC structures in the examples below are configured as polarization rotators of an image of a local area being imaged by the NED 100. In the embodiments discussed below in conjunction with FIGS. 3-5, the stacked LC structure may additionally or alternatively be configured as a switchable waveplate responsive to an applied voltage. It should be noted that in one or more embodiments, the field of view of the various stacked LC structures is between 60 to 120 degrees. It is important to note that these designs are merely illustrative, and other designs of stacked structures may be generated using the principles described herein.

Figure 3:
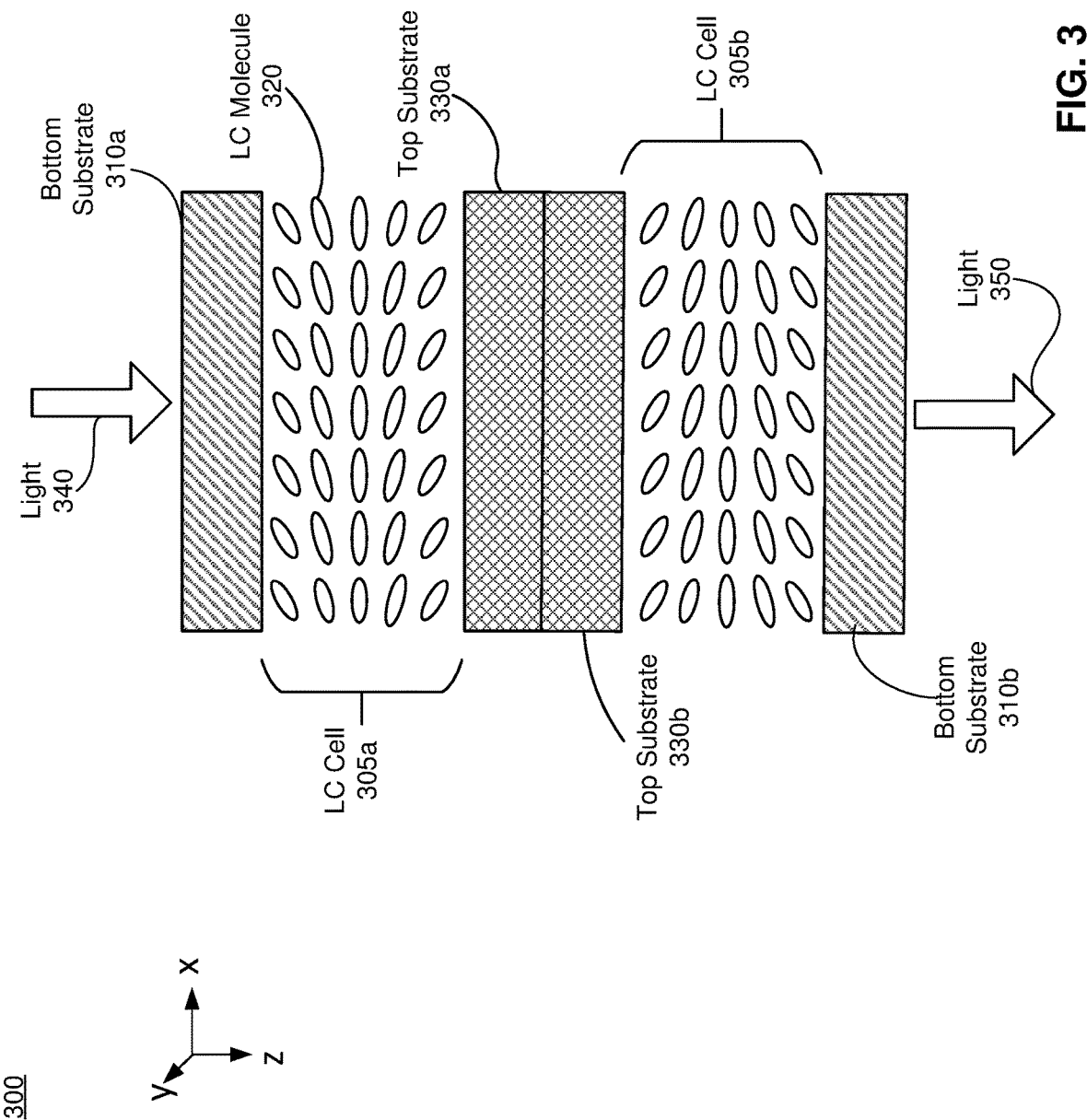
FIG. 3 is a design of a stacked LC structure that includes two LC cells configured as Pi Cells, in accordance with an embodiment.

FIG. 3 is a design of a stacked LC structure 300 that includes two LC cells 305a and 305b configured as Pi Cells, in accordance with an embodiment. The stacked LC structure 300 comprises two LC cells (e.g., LC cell 305a and LC cell 305b), a bottom substrate 310a, and top substrate 330a. The LC cell 305a and LC cell 305b are optically isotropic colloidal systems in which the dispersive medium is a highly structured liquid that is sensitive to e.g., electric and magnetic fields. The LC cells 305a and 305b each suspend a plurality of LC molecules 320. In various example embodiments, each of the LC cell 305a and LC cell 305b are approximately 100 nanometers (nm) to 500 nm thick. We note that the thickness of the LC cell is may vary based on, e.g., an index of refraction of the liquid crystal.

The LC cells 305a and 305b are both stabilized into a Pi state. That is, the plurality of LC molecules 320 encapsulated within the LC cells 305a and 305b are configured to form Pi cells. Pi cells are generally used in applications requiring fast response times and increased viewing angle (e.g., large screen televisions and high speed optical shutters). In the LC cells 305a and 305b, the plurality of LC molecules 320 has a 180° twist angle. Each of the plurality of LC molecules 320 are elongated, rod-like organic molecules with a dipole moment along the axis of the molecule. In one or more embodiments, each of the plurality of LC molecules 320 have a size of a few nanometers and comprise both rigid and flexible parts allowing for orientational and positional order. In an embodiment, the plurality of LC molecules may exhibit optical birefringence depending on external conditions such as an external field (e.g., an applied voltage). Generally, in a Pi Cell, when the electric field is switched off (e.g., the application of 0 V) the LC molecules 320 experience a torque which causes an electro-optical response of the Pi Cell. Thus, the modulation of an external field to a LC cell (e.g., LC cell 305a or LC cell 305b) may result in modification of the optical birefringence of that LC cell.

Each of the LC cells 305a and 305b are between two optically transparent electrodes. The top substrates 330a and 330b and bottom substrates 310a and 310b comprise a glass substrate coated with an optically transparent electrically conductive polymer. In other embodiments, the top substrates 330a and 330b are an optically transparent plastic coated with an electrically conductive polymer. In an example embodiment, the optically transparent electrically conductive polymer is indium tin oxide (ITO). In this embodiment, the bottom substrates 310a and 310b are isotropic and do not affect the polarization of broadband light as it passes through the substrate. The top substrates 330a and 330b and the bottom substrates 310a and 310b are configured to apply a uniform electric field through the LC cells 305a and 305b, respectively. In FIG. 3, the LC cell 305a is coupled to the top substrate 330a and the bottom substrate 310a. Similarly, in FIG. 3, the LC cell 305b is coupled to a top substrate 330b and bottom substrate 310a. Here, the LC cell 305a and LC cell 305b are configured such that one of the cells is configured to drive the stacked LC structure 300 (i.e., control its total phase retardation) while the other is configured as a compensator or backup in the event that a failure is detected. In various embodiments, each of the top substrates 330a and 330b and the bottom substrates 310a and 310b are further coupled to a controller (not shown) configured to apply a voltage to one or more of the top substrates 330a and 330b. Here, the application of a voltage causes the formation of an electric field through one or more of the LC cell 305a and LC cell 305b. In various embodiments, the generated electric field is proportional to the applied voltage. In still other embodiments, the controller is configured to determine a failure in one of the LC cells (e.g., LC cell 305a or LC cell 305b) and adjust the voltage applied accordingly. For example, if a failure is detected in LC cell 305a, the controller may apply a voltage to LC cell 305b such that it drives the total phase retardation of the stacked LC structure 300.

Turning now to the propagation of light through the stacked LC structure 300, in FIG. 3, light 340 is incident on the bottom substrate 310a. The light 340 is transmitted into the LC cell 305a via the bottom substrate 310a. As the light 340 propagates through the LC cell 305a, polarizations of the light 340 corresponding to the ordinary and extraordinary axis of the LC cell 305a take different paths through the LC cell 305a. And an amount of phase adjustment occurs based at least in part on the ordinary and extraordinary axis having different indices of refraction. Thus, the LC cell 305a applies a first amount of phase adjustment to the light 340 as it propagates through the LC cell 305a. The light 340 is transmitted into the LC cell 305b via the top substrate 330a and top substrate 330b. The LC cell 305b is configured to apply a second amount of phase adjustment to the light 340. The light 340 exits the stacked LC structure 300, via the bottom substrate 310b, as a light 350. The light 350 is light 340 after its phase is adjusted by a third amount wherein the third amount is not equal to a linear combination of the first amount and the second amount. That is, the stacked LC structure 300 depicted in conjunction with FIG. 3 is configured to apply a third amount of phase adjustment to the light 340. In an example embodiment, the light 350 is RCP, LCP, horizontally linearly polarized, vertically lineally polarized, or any combination thereof. For example, a third amount of phase adjustment results in the light 350 being RCP while the light 340 is LCP. In an example embodiment, as the light 350 propagates through the LC cell 305a, the LC cell 305a generates the desired image and an associated ghost image due to the birefringence of the LC cell 305a. In the previous example embodiment, the LC cell 305b is configured such that its birefringence is orthogonal to that of the first cell. That is, the birefringence of the LC cell 305b is such that it negates the birefringence of the LC cell 305a, thus reducing the field of view of the ghost image. It should be noted that two LC cells (e.g., LC cell 305a and LC cell 305b) need to be configured such that the birefringence of one balances that of the other. In one embodiment, the LC cells 305a and 305b are configured such that both LC cell 305a and LC cell 305b are identical and are oriented such that the average molecular alignment of LC cell 305a and 305b are orthogonal to one another. Alternatively, the LC cells 305a and 305b may be configured such they are oriented to be antiparallel to one another. In still other embodiments, the stacked LC structure 300 may comprise two or more LC cells as long as the two or more LC cells are configured to compensate for the other LC cells. The total phase retardation of the stacked LC structure 300 is a quarter waveplate, a half waveplate, or a one-waveplate. Here, the total phase retardation of the stacked LC structure 300 may be controllable through the application of a voltage to one a LC cell (e.g., LC cell 305a).

FIG. 4A is a design of a stacked LC structure 400, in accordance with an embodiment. The stacked LC structure 400 comprises a LC cell 405a, a LC cell 405b, two bottom substrates 410a and 410b, and two top substrates 430a and 430b. In FIG. 4A, the LC cells 405a and 405b are embodiments of LC cells 305a and 305b; top substrates 430a and 430b are embodiments of top substrates 330a and 330b; and bottom substrates 410a and 410b are embodiments of bottom substrates of 310a and 310b. The LC cells 305a and 305b, the bottom substrates 310a and 310b, and top substrates 330a and 330b are described in detail, above, in conjunction with FIG. 3.

Each of the LC cells 405a and 405b comprises a plurality of LC molecules 420. The plurality of LC molecules 420 are an embodiment of LC molecules 320 described in detail, above, in conjunction with FIG. 3. In FIG. 4A, each of the plurality of LC molecules 420 are oriented such that the dipole moment of the LC molecule is at 3° in the X-Z plane. The LC cell 405a is between the bottom substrate 410a and the top substrate 430a. Similarly, the LC cell 405b is between the top substrate 430b and bottom substrate 410b. In one or more embodiments, the bottom substrate 410a and the top substrate 430a are configured to generate an electric field of a first polarization across the LC cell 405a; and the top substrate 430b and bottom substrate 410b are configured to generate an electric field across the LC cell 405a with a second polarization that is opposite that of the first polarization.

The bottom substrate 410a is coupled to the LC cell 405a and the top substrate 430a is coupled to both the LC cell 405a and the top substrate 430b. Light 440 is an embodiment of light 340 and is incident on the bottom substrate 410a. The light 440 is transmitted into the LC cell 405a via the bottom substrate 410a. As the light 440 propagates through the LC cell 405a, different polarization components of the light 440 are affected differently by the ordinary and extraordinary axis of the LC cell 405a, and take different paths through the LC cell 405a. Thus, the LC cell 405a applies a first amount of phase adjustment to the light 440. The light 440 is transmitted into the LC cell 405b from the LC cell 405a via the top substrate 430a and the top substrate 430b. The LC cell 405b is located between the top substrate 430b and the bottom substrate 410b. The LC cell 405b is configured to apply a second amount of phase adjustment to the light 440 as it propagates through it. The light 440 exits the stacked LC structure 400, via the bottom substrate 410b, as a light 450. The stacked LC structure 400 is configured to impart a third amount of phase adjustment to the broadband light as it propagates through the stacked LC structure 400. Here, the third amount of phase adjustment is not a linear combination of the first amount of phase adjustment and the second amount of phase adjustment. In other embodiments, the LC cell 405b is utilized as a backup cell for driving the system. For example, in embodiments in which the LC cell 405a is used to drive the total phase retardation of the stacked LC structure 400 and a failure is detected in LC cell 405a, the LC cell 405b is operated as the driving cell instead.

FIG. 4B is a design of a stacked LC structure 400 depicted in FIG. 4A in an alternate configuration. That is, the stacked LC structure 400 in FIG. 4B is configured to be antiparallel to that depicted in conjunction with FIG. 4A. In an embodiment, the top substrate 430a and the bottom substrate 410a are configured to generate an electric field of a first polarization across the LC cell 405a, and the bottom substrate 410b and the top substrate 430b are configured to generate an electric field of a second polarization across the LC cell 405b and the second polarization is opposite that of the first polarization.

In FIG. 4B, the light 440 is incident upon the top substrate 430a and propagates through the LC cell 405a and into the LC cell 405b via the bottom substrate 410a and the bottom substrate 410b. The light 440 exits the stacked LC structure 400 as a light 450 via the bottom substrate 410a. The stacked LC structure 400 depicted in conjunction with FIG. 4B is configured to apply a third amount of phase adjustment to the polarization of the light 440 propagating through it. That is, a polarization of the light 450 is that of light 440 changed by a third amount of phase adjustment, representative of a total phase adjustment caused by the stacked LC structure 400. And the total amount of phase adjustment is such that polarization of light 450 may be rotated relative to the light 440. Here, the third amount of phase adjustment is not a linear combination of the first amount of phase adjustment and the second amount of phase adjustment associated with LC Cells 405a and 405b, respectively.

Figures 5A, 5B:
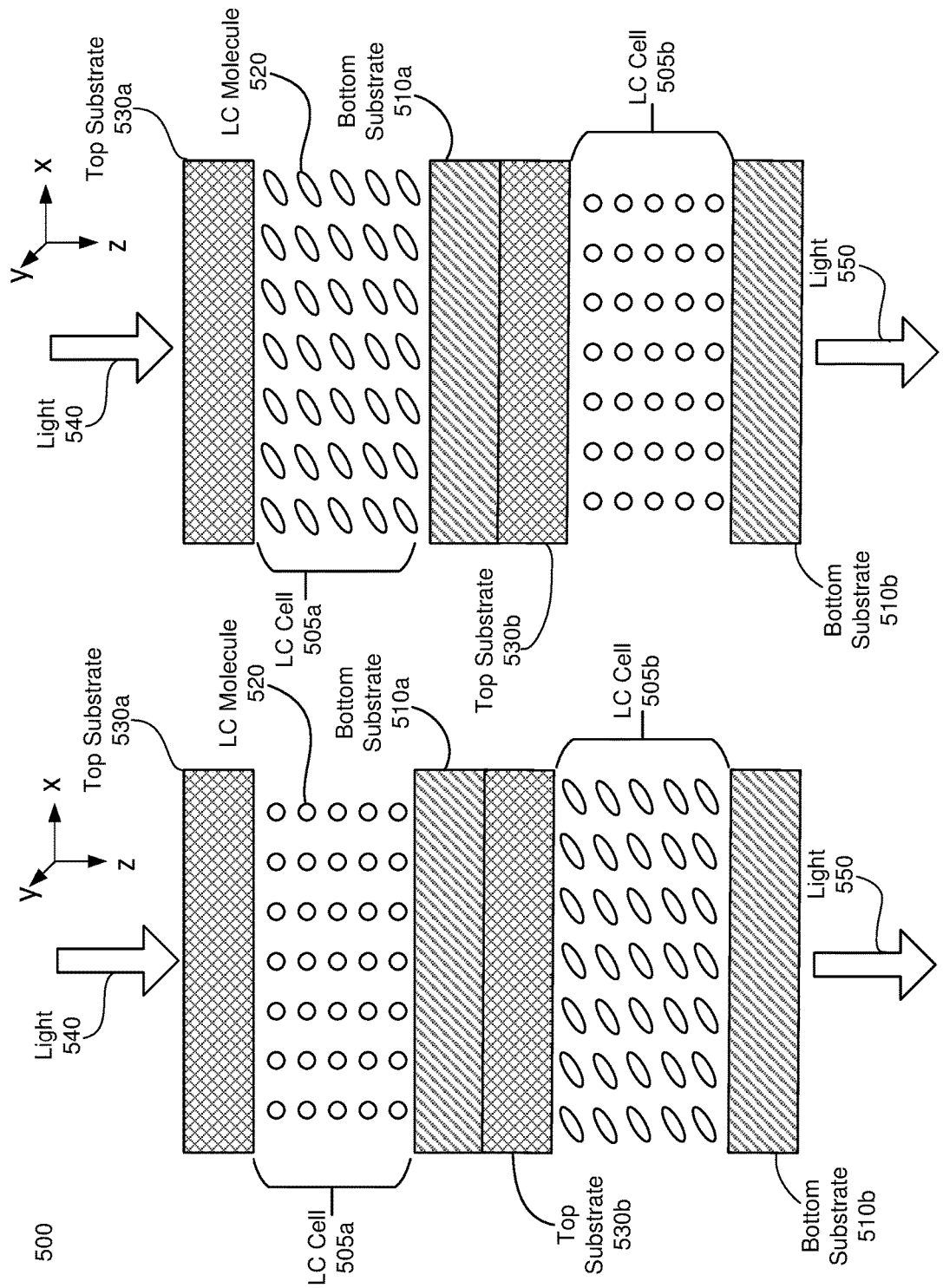
FIG. 5A is a design of a stacked LC structure that includes two LC cells with perpendicular alignment, in accordance with an embodiment.
FIG. 5B is the design of a stacked LC structure depicted in FIG. 5A in an alternate configuration, in accordance with an embodiment.

FIG. 5A is a design of a stacked LC structure 500 that includes two LC cells 505a and 505b with perpendicular alignment, in accordance with an embodiment. The stacked LC structure 500 comprises a LC cell 505a, a LC cell 505b, two bottom substrates 510a and 510b, and two top substrates 530a and 530b. In a perpendicular alignment, the average molecular alignment of the LC cell 505a is orthogonal to that of the LC cells 505b. In FIG. 5A, the LC cells 505a and 505b are embodiments of LC cells 305a and 305b, top substrates 530a and 530b are embodiments of top substrates 330a and 330b, and bottom substrates 510a and 510b are embodiments of bottom substrates of 310a and 310b. The LC cells 305a and 305b, the bottom substrates 310a and 310b, and top substrates 330a and 330b are described in detail, above, in conjunction with FIG. 3.

Both of the LC cells 505a and 505b comprise a plurality of LC molecules 520. The plurality of LC molecules 520 are an embodiment of the LC molecules 320 described in detail above in conjunction with FIG. 3. Each of the plurality of LC molecules 520 associated with the LC cell 505a are oriented such their dipole moment are parallel to the y axis. On the other hand, the plurality of LC molecules 520 associated with the LC cell 505b are oriented such that their dipole moment is in a range between 0.5° and 89.5° to the X-Z plane, in the absence of an electric field. In some embodiments, the plurality of LC molecules 520 make an angle in the range of 0.5° to 10° to the X-Z plane in embodiments where the LC cells 505a and 505b have a positive dielectric anisotropy. In some embodiments, the plurality of LC molecules 520 make an angle in the range of 80° to 89.5° to the X-Z plane in embodiments where the LC cells 505a and 505b have a negative dielectric anisotropy. A birefringence of each of the plurality of LC molecules 520 is an intrinsic property of a LC molecule associated with the plurality of LC molecules 520. That is, a birefringence of a LC molecule of the plurality of LC molecules 520 is not related to its orientation. In various embodiments, a phase retardation experienced by a light propagating through a LC cell (e.g., LC cell 505a and 505b) is related to the orientation of the plurality of the LC molecules. For example, in embodiments including an LC cell 505a and 505b with a positive dielectric anisotropy, the retardation decreases with an increased tilt angle. In some other embodiments including a LC cell 505a and 505b with a negative dielectric anisotropy, the phase retardation experienced by a light passing through the LC cell 505a and 505b increases with a decreased tilt angle. The LC cell 505a is between the top substrate 530a and bottom substrate 510a such that the top substrate 530a and bottom substrate 510a are configured to apply an electric field across the LC cell 505a. Here, the bottom substrate 510a is coupled to the bottom substrate 510b. The LC cell 505b is between the top substrate 530b and the bottom substrate 510b such that an electric field applied to the LC cell 505b is oriented antiparallel to the electric field applied to the LC cell 505a.

In FIG. 5A, the top substrate 530a is coupled to the LC cell 505a and the bottom substrate 510a is coupled to both the LC cell 405a and the top substrate 530b. A light 540 is an embodiment of the light 340 and is incident on the top substrate 530a. The light 540 is transmitted into the LC cell 505a via the top substrate 530a. As the light 540 propagates through the LC cell 505a, polarization of the light 540 corresponding to the ordinary and extraordinary axis of the LC cell 505a take different paths through the LC cell 505a. Thus, the LC cell 505a changes the polarization of the light 540 as it propagates through the LC cell 505a. The light 540 is transmitted into the LC cell 505b from the LC cell 505a via the top substrate 530a and the bottom substrate 510a. The LC cell 505b is between the top substrate 530b and the bottom substrate 510b and is configured to change the polarization of the light 540 by a second amount as it propagates trough the LC cell 505b. The light 540 exits the stacked LC structure 500, via the bottom substrate 510b, as a light 550. The light 550 is light 540 whose polarization is changed by a third amount of phase adjustment, representative of a total phase adjustment caused by the stacked LC structure 500. And the total amount of phase adjustment is such that polarization of light 550 may be rotated relative to the light 540. Note that the third amount of phase adjustment is not a linear combination of the first amount of phase adjustment and the second amount of phase adjustment. In other embodiments, the LC cell 505b is utilized as a backup cell for driving the system. For example, in embodiments in which the LC cell 505a is used to drive the total phase retardation of the stacked LC structure 500 and a failure is detected in LC cell 505a, the LC cell 505b is operated as the driving cell instead.

FIG. 5B is the design of a stacked liquid crystal structure 500 depicted in FIG. 5A in an alternate configuration, in accordance with an embodiment. That is, the stacked LC structure 500 in FIG. 5A is configured to be perpendicular to that depicted in conjunction with FIG. 5A. In an embodiment, the bottom substrate 510a and the top substrate 530a are configured to generate a uniform electric field oriented antiparallel to the z axis through the LC cell 505a; and the bottom substrate 510b and the top substrate 530b are configured to generate a uniform electric field through the LC cell 505b such that the electric field is oriented antiparallel to the electric field through the LC cell 505a.

In FIG. 5B, the light 540 is incident upon the top substrate 530a and propagates through the LC cell 505a and into the LC cell 505b via the bottom substrate 510a and the top substrate 530b. The light 540 exits the stacked LC structure 500 as light 550 via the bottom substrate 510b. In various embodiments, the light 550 is light 540 whose polarization is changed by a third amount of phase adjustment, representative of a total phase adjustment caused by the stacked LC structure 500. And the total amount of phase adjustment is such that polarization of light 550 may be rotated relative to the light 540. Note that the third amount of phase adjustment is not a linear combination of a first amount and a second amount of phase adjustment associated with the LC Cell 505a and 505b, respectively.

Additionally, performance of a stacked LC structure (e.g., stacked LC structure 300, stacked LC structure 400, and stacked LC structure 500) may be improved through the application of one or more compensation layers to the LC cells. For example, one or more compensation layers may be used to increase a range of wavelengths over which the amount of phase adjustment caused by one or more stacked LC structures is wavelength independent. Generally, the compensation layer is a multilayer birefringence film. For example, each of the one or more compensation layers provide one of a c-plate compensation, uniaxial a-plate compensation, and negative birefringent film compensation. In still other embodiments, the compensation layer may provide negative o-plate, positive o-plate, and liquid crystal compensation (LCC) compensation.

System Environment

Figure 6:
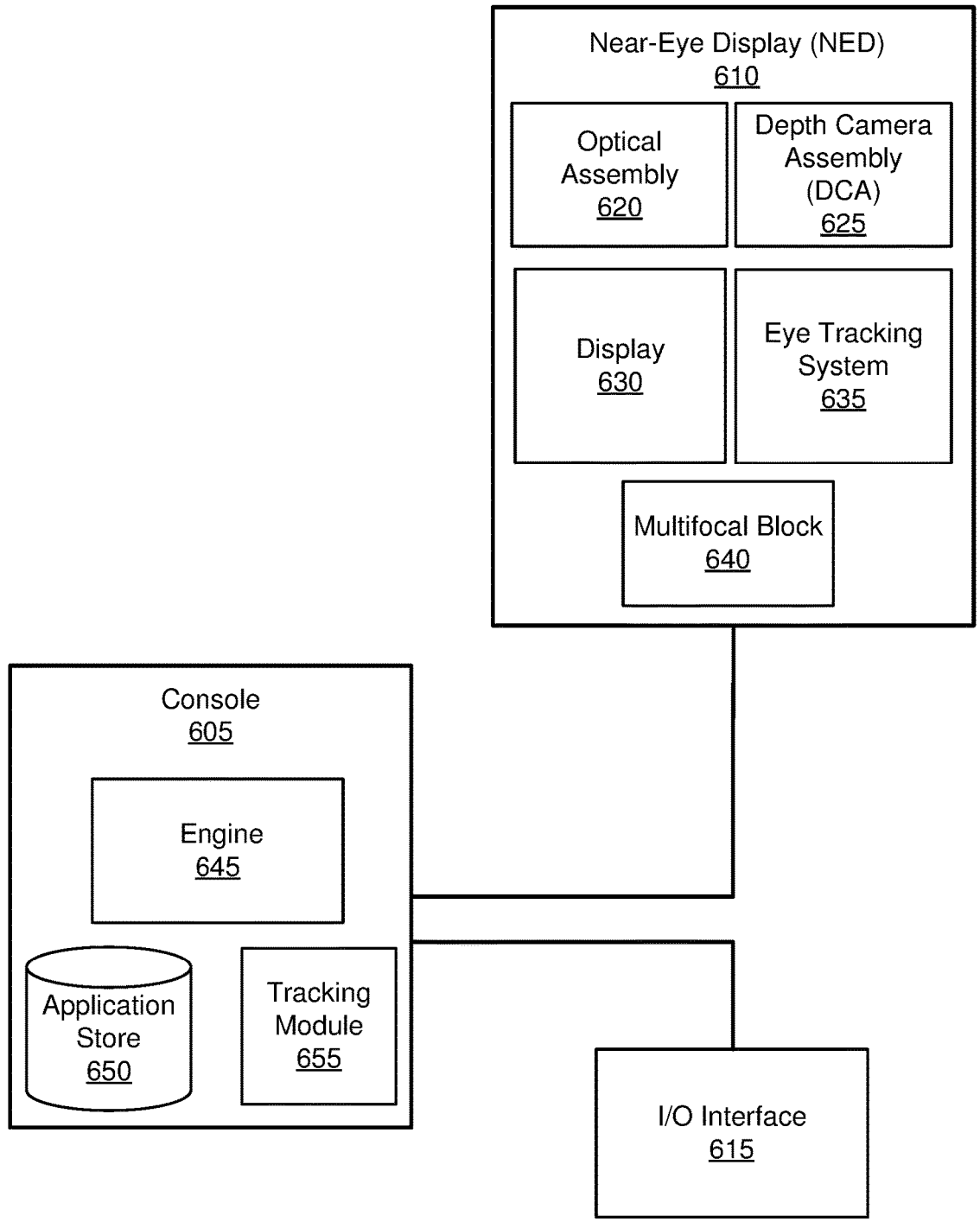
FIG. 6 is a block diagram of a system environment that includes the NED shown in FIG. 1, in accordance with an embodiment.

FIG. 6 is a block diagram of one embodiment of a NED system 600 in which a console 605 operates. The NED system 600 may operate in an artificial reality environment. The NED system 600 shown by FIG. 6 comprises a NED 610 and an input/output (I/O) interface 615 that is coupled to the console 605. While FIG. 6 shows an example NED system 600 including one NED 610 and on I/O interface 615, in other embodiments any number of these components may be included in the NED system 600. For example, there may be multiple NEDs 610 each having an associated I/O interface 615, with each NED 610 and I/O interface 615 communicating with the console 605. In alternative configurations, different and/or additional components may be included in the NED system 600. Additionally, functionality described in conjunction with one or more of the components shown in FIG. 6 may be distributed among the components in a different manner than described in conjunction with FIG. 6 in some embodiments. For example, some or all of the functionality of the console 605 is provided by the NED 610.

The NED 610 is a near-eye display (also referred to as a head-mounted display) that presents content to a user comprising virtual and/or augmented views of a physical, real-world environment with computer-generated elements (e.g., two-dimensional or three-dimensional images, two-dimensional or three-dimensional video, sound, etc.). In some embodiments, the presented content includes audio that is presented via an external device (e.g., speakers and/or headphones) that receives audio information from the NED 610, the console 605, or both, and presents audio data based on the audio information. The NED 610 includes an optical assembly 620, a depth camera assembly (DCA) 625, display 630, eye tracking system 635, multifocal block 640. Some embodiments of the NED 610 have different components than those described in conjunction with FIG. 6. Additionally, the functionality provided by various components described in conjunction with FIG. 6 may be differently distributed among the components of the NED 610 in other embodiments. An embodiment of the NED 610 is the NED 100 described above in conjunction with FIG. 1.

The optical assembly 620 magnifies image light received from the display 630, corrects optical errors associated with the image light, and presents the corrected image light to a user of the NED 610. The optical assembly 620 includes a plurality of optical elements. Example optical elements included in the optical assembly 620 include: an aperture, a Fresnel lens, a convex lens, a concave lens, a filter, a reflecting surface, or any other suitable optical element that affects image light. Moreover, the optical assembly 620 may include combinations of different optical elements. Optical elements may also include switchable waveplates formed through the use of one or more stacked LC structures (e.g., stacked LC structures 300, 400, and 500). Examples of optical elements including stacked LC structures include quarter waveplates, half waveplates, and full waveplate. In some embodiments, one or more of the optical elements in the optical assembly 620 may have one or more coatings, such as partially reflective or anti-reflective coatings.

The DCA 625 captures data describing depth information of an area surrounding the NED 610. The DCA 625 may determine depth information based on one or more of a structured light emitter, time of flight camera, or some combination thereof. The DCA 625 can compute the depth information using the data, or the DCA 625 can send this information to another device such as the console 605 that can determine the depth information using data from the DCA 625.

The DCA 625 includes an illumination source, an imaging device, and a controller. The illumination source emits light to track the user's eye. In an embodiment, the emitted light is a structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic light-emitting diodes (LEDs), a vertical-cavity surface-emitting laser (VCSEL), or some other source. In some embodiments, a single emitter or a plurality of emitters in the illumination source can emit light having a structured light pattern. The imaging device captures ambient light and light from one or more emitters of the plurality of emitters of the plurality of emitters that is reflected from objects in the area. The imaging device may be an infrared camera, or a camera configured to operate in a visible spectrum. The controller coordinates how the illumination source emits light and how the imaging device captures light in order to determine the distance between the user and various objects in a local area surrounding the NED 610. In some embodiments, the controller also determines depth information associated with the local area using the captured images.

The display 630 displays two-dimensional or three-dimensional images to the user in accordance with data received from the console 605. In various embodiments, the display 630 comprises a single display or multiple displays (e.g., a display for each eye of a user). In some embodiments, the display 630 comprises a single or multiple waveguide displays. Light can be coupled into the single or multiple waveguide displays via, e.g., a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, some other display, a scanner, one-dimensional array, or some combination thereof. An embodiment the display 630 is a waveguide-based display assembly configured to render information (i.e., pictures, text, and video) such that it appears at a location in the local area associated with an object in the local area as determined by the DCA 625.

In some embodiments, the optical assembly 620 may be, additionally, configured to correct one or more types of optical error. Examples of optical error include barrel or pincushion distortions, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the display 630 for display is pre-distorted, and the optical assembly 620 corrects the distortion when it receives image light from the display 630 generated based on the content.

The eye tracking system 635 is integrated into the NED 610. The eye tracking system 635 determines eye tracking information associated with an eye of a user wearing the NED 610. The eye tracking information determined by the eye tracking system 635 may comprise information about a position of the user's eye, i.e., information about an angle of an eye-gaze. Alternatively, or additionally, the eye-tracking system 635 may comprise one or more illumination sources and an imaging device (camera) directed towards the eye and is configured to determine a vergence depth of a user's gaze based on the gaze point or an estimated intersection of the gaze lines determined by the one or more illumination sources associated with the eye tracking system 635. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the eye tracking system 635 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The multifocal block 640 activates or deactivates one or more SHWPs, one or more stacked LC structures, or some combination thereof to adjust the focal length (i.e., adjust the optical power) of the multifocal block 640. In various embodiments, the multifocal block 640 adjusts its focal length responsive to one or more instructions from the console 605 based on information about the local scene received from the DCA 625.

The multifocal block 640 is coupled to the eye tracking system 635 to obtain eye tracking information determined by the eye tracking system 635. The multifocal block 640 may be configured to adjust focus of image light emitted from the display 630, based on the determined eye tracking information obtained from the eye tracking system 635. In this way, the multifocal block 640 can mitigate vergence-accommodation conflict in relation to the image light. The multifocal block 640 can be interfaced (e.g., either mechanically or electrically) with at least one optical element of the optical assembly 620. Then, the multifocal block 640 may be configured to adjust focus of the image light emitted from the display 630 and propagated through the optical assembly 620 by adjusting an optical position of the at least one optical element of the optical assembly 620, based on the determined eye tracking information obtained from the eye tracking system 635. By adjusting the optical position, the multifocal block 640 varies focus of the image light propagated through the optical assembly 620 towards the user's eye. The multifocal block 640 may be also configured to adjust resolution of the image light emitted by the display 630 by performing foveated rendering of the image light, based at least in part on the determined eye tracking information obtained from the eye tracking system 635. In this case, the multifocal block 640 provides appropriate image signals to the display 630. The multifocal block 640 provides image signals with a maximum pixel density for the display 630 only in a foveal region of the user's eye-gaze, while providing image signals with lower pixel densities in other regions.

The I/O interface 615 is a device that allows a user to send action requests and receive responses from the console 605. An action request is a request to perform a particular action. For example, an action request may be an instruction to start or end capture of image or video data or an instruction to perform a particular action within an application. The I/O interface 615 may include one or more input devices. Example input devices include: a keyboard, a mouse, a game controller, or any other suitable device for receiving action requests and communicating the action requests to the console 605. An action request received by the I/O interface 615 is communicated to the console 605, which performs an action corresponding to the action request. In some embodiments, the I/O interface 615 includes an IMU that captures calibration data indicating an estimated position of the I/O interface 615 relative to an initial position of the I/O interface 615. In some embodiments, the I/O interface 615 may provide haptic feedback to the user in accordance with instructions received from the console 605. For example, haptic feedback is provided when an action request is received, or the console 605 communicates instructions to the I/O interface 615 causing the I/O interface 615 to generate haptic feedback when the console 605 performs an action.

The console 605 provides content to the NED 610 for processing in accordance with information received from one or more of: the DCA 625, the NED 610, and the I/O interface 615. In the example shown in FIG. 6, the console 605 includes an application store 650, a tracking module 655, and an engine 645. Some embodiments of the console 605 have different modules or components than those described in conjunction with FIG. 6. Similarly, the functions further described below may be distributed among components of the console 605 in a different manner than described in conjunction with FIG. 6.

The application store 650 stores one or more applications for execution by the console 605. An application is a group of instructions, that when executed by a processor, generates content for presentation to the user. Content generated by an application may be in response to inputs received from the user via movement of the NED 610 or the I/O interface 615. Examples of applications include: gaming applications, conferencing applications, video playback applications, or other suitable applications.

The tracking module 655 calibrates the NED system 600 using one or more calibration parameters and may adjust one or more calibration parameters to reduce error in determination of the position of the NED 610 or of the I/O interface 615. For example, the tracking module 655 communicates a calibration parameter to the DCA 625 to adjust the focus of the DCA 625 to more accurately determine positions of structured light elements captured by the DCA 625. Calibration performed by the tracking module 655 also accounts for information received from an inertial measurement unity (IMU) in the NED 610 and/or an IMU included in the I/O interface 615. The IMU is an electronic device that generates data indicating a position of NED 610 based on measurement signals received one or more position sensors associated with the NED 610. Here, the one or more position sensors associated with the NED 610 generate one or more measurement signals in response to the motion of the NED 610. Examples of position sensors include one or more accelerometers, one or more gyroscopes, one or more magnetometers, another suitable type of sensor that detects motion, a type of sensor used for error correction, or some combination thereof. The one or more position sensors may be located external or internal to the IMU. Additionally, if tracking of the NED 610 is lost (e.g., the DCA 625 loses line of sight of at least a threshold number of structured light elements), the tracking module 655 may re-calibrate some or all of the NED system 600.

The tracking module 655 tracks movements of the NED 610 or of the I/O interface 615 using information from the DCA 625, the one or more position sensors 716, the IMU or some combination thereof. For example, the tracking module 655 determines a position of a reference point of the NED 610 in a mapping of a local area based on information from the NED 610. The tracking module 655 may also determine positions of the reference point of the NED 610 or a reference point of the I/O interface 615 using data indicating a position of the NED 610 from the IMU or using data indicating a position of the I/O interface 615 from an IMU included in the I/O interface 615, respectively. Additionally, in some embodiments, the tracking module 655 may use portions of data indicating a position or the NED 610 from the IMU as well as representations of the local area from the DCA 625 to predict a future location of the NED 610. The tracking module 655 provides the estimated or predicted future position of the NED 610 or the I/O interface 615 to the engine 645.

The engine 645 generates a three-dimensional mapping of the area surrounding the NED 610 (i.e., the "local area") based on information received from the NED 610. In some embodiments, the engine 645 determines depth information for the three-dimensional mapping of the local area based on information received from the DCA 625 that is relevant for techniques used in computing depth. The engine 645 may calculate depth information using one or more techniques in computing depth from the portion of the reflected light detected by the DCA 625, such as the stereo based techniques, the structured light illumination technique, and the time-of-flight technique. In various embodiments, the engine 645 uses the depth information to, e.g., update a model of the local area, and generate content based in part on the updated model.

The engine 645 also executes applications within the NED system 600 and receives position information, acceleration information, velocity information, predicted future positions, or some combination thereof, of the NED 610 from the tracking module 655. Based on the received information, the engine 645 determines content to provide to the NED 610 for presentation to the user. For example, if the received information indicates that the user has looked to the left, the engine 645 generates content for the NED 610 that mirrors the user's movement in a virtual environment or in an environment augmenting the local area with additional content. Additionally, the engine 645 performs an action within an application executing on the console 605 in response to an action request received from the I/O interface 615 and provides feedback to the user that the action was performed. The provided feedback may be visual or audible feedback via the NED 610 or haptic feedback via the I/O interface 615.

In some embodiments, based on the eye tracking information (e.g., orientation of the user's eye) received from the eye tracking system 635, the engine 645 determines resolution of the content provided to the NED 610 for presentation to the user on the display 630. The engine 645 may be configured to adjust resolution of the content provided to the NED 610 by performing foveated rendering of the presented content, based at least in part on the determined eye tracking information obtained from the eye tracking system 635. The engine 645 provides the content to the NED 610 having a maximum resolution on the display 630 in a foveal region of the user's gaze, whereas the engine 645 provides a lower resolution in other regions, thus achieving less power consumption at the NED 610 and saving computing cycles of the console 605 without compromising a visual experience of the user. In some embodiments, the engine 645 can further use the eye tracking information to adjust focus of the image light emitted from the display 630 to prevent the vergence-accommodation conflict. In still other embodiments, the engine 645 may determine a distance between an object in the local area associated with the NED 610 and a tracked position of the user's eye determined by the eye tracking system 635 and instruct one or more of the display 630 and the multifocal block 640 to render text images of videos at a focal distance associated with the object being imaged. That is, the engine 645 may be configured to render virtual objects such that they appear to be in the local area from the user's point of view.

The engine 645 may be configured to generate one or more emission instructions (e.g., via a controller associated with the NED 610). The generated emission instructions include information about a level of voltage applied to a stacked LC structure (e.g., one of stacked LC structures 300, 400, and 500) associated with NED 610. Responsive to the level of voltage in the emission instructions, the engine 645 modulates the image light propagating through the multifocal block 640. In various embodiments, the engine 645 determines that a failure has occurred in one of the stacked LC structures (e.g., one of the stacked LC structures 300, 400, and 500. Determining that a failure has occurred comprises determining that the intensity of a ghost image is above a threshold value. In some embodiments, determining that a failure has occurred comprises that the light output by a stacked LC structure does not have the appropriate polarization. In still other embodiments, determining that a failure has occurred comprises an input from a user the NED 610. In one or more embodiments, determining that the intensity of a ghost image is above a threshold value utilizes a camera associated with a controller associated with the NED 610; and determining that the light output by a stacked LC structure is not the appropriate polarization comprises the use of a camera and one or more polarizers. Responsive to determining that a failure has occurred, the engine 645 may generate instructions identifying the driving LC cell (e.g., LC cell 305*a-b*, 405*a-b*, and 505*a-b*) driving a stacked LC structure. In one or more embodiment, instructions comprise a voltage value provided by a controller associated with the NED 610 based on one or more instructions from the engine 645.

Specific Design Examples

Below various specific design examples of stacked LC structures are discussed. The examples below discuss different configurations of stacked LC structures that each provide, broadband switching (e.g., 450 nm-650 nm) of circularly polarized light for a large FOV. The design examples discussed herein enable board-band and broad angular polarization rotators. Additionally, in each of the embodiments discussed below in conjunction with FIGS. 7-10, the total phase retardation of the stacked LC structure is controllable through the application of a voltage to one of the optically transparent and electrically conductive substrates. That is, the stacked LC structures discussed below in conjunction with FIGS. 7-10 may additionally or alternatively be configured as a switchable waveplate responsive to an applied voltage. Here, total phase retardation of the stacked LC structures may be equivalent to that of a quarter waveplate, a half waveplate, and a full waveplate.

The geometric shape of the stacked LC structures is similar to that of common prescription lenses. For example, geometric shapes embodied by the LC structures discussed herein may be one of a square shape, a round shape, a triangular shape, an oblong shape, an oval shape, a diamond shape, and a heart shape. Thus, in an embodiment, the LC structures may be manufactured to match shape of the user's face. We note that the designs discussed herein are may include Pancharatnam Berry Phase (PBP) liquid crystal lenses and as well as any optical element associated with linearly or circularly polarized light (e.g., lenses, gratings, polarizers, rotators, and waveplates). PBP liquid crystal lenses are described in U.S. application Ser. No. 15/693,846, filed Sep. 1, 2017, which is incorporated by reference in its entirety herein.

In some embodiments, the stacked LC structures described herein may be configured into one of two states based on an applied voltage value by, for example, a controller. The controller is configured to apply a first voltage value and a second voltage value wherein the first voltage value is lower than the second voltage value. For example, the first voltage value is 0 volts (V) and the second voltage value is 9 V. In various embodiments, a frame rate of the stacked LC structure is dependent upon the applied voltage.

It is important to note that these designs are merely illustrative, and other designs of stacked LC structures may be generated using the principles described herein.

Figure 7:
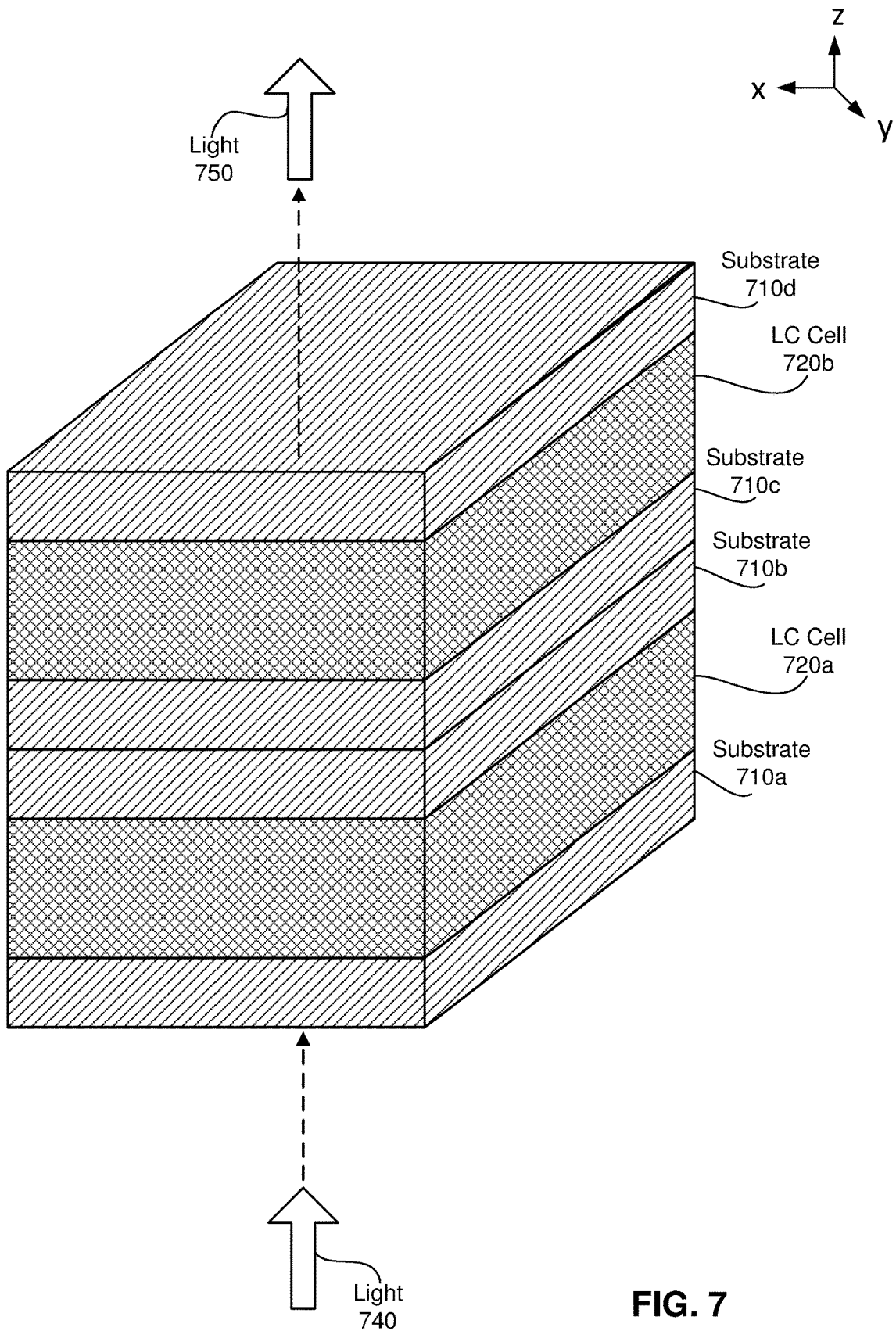
FIG. 7 is an isometric view of a stacked LC structure comprising LC cells in a twist angle configuration, in accordance with an embodiment.

FIG. 7 is an isometric view of a stacked LC structure 700 comprising two LC cells in a twist angle configuration, in accordance with an embodiment. The stacked LC structure 700 additionally includes four substrates 710a, 710b, 710c, and 710d. Here, the LC cell 720a is between substrate 710a and substrate 710b and LC cell 720b is between substrate 710c and substrate 710d. In FIG. 7, light 740 is incident on substrate 710a and propagates through the stacked LC structure 700 via the substrate 710a, LC cell 720a, substrate 710b, substrate 710c, LC cell 720b, and substrate 710d. The light 740 exits the stacked LC structure 700 via the substrate 710d as light 750. The substrates 710a-d are optically isotropic and are configured to apply a uniform electric field through a LC cell (e.g., one of LC cell 720a or LC cell 720b) in response to an applied voltage. For example, each of the substrates 710a-d are comprised of a glass, or a plastic material coated with an optically transparent film type electrode (i.e., ITO). The substrates 710a, 710b, 710c, and 710d are each an embodiment of any one of the bottom substrates 310a-b, 410a-b, and 510a-b or the top substrates 330a-b, 430a-b, and 530a-b which are discussed, above, in conjunction with FIGS. 3A-B, 4A-B, and 5A-B. The LC cells 720a-b are embodiments any one of the LC cells 305a-b which are discussed, above, in conjunction with FIGS. 3A-B, 4A-B, and 5A-B.

In the example embodiments depicted, below, the LC cell 720a and LC cell 720b are both sensitive to an applied electric field and comprise a plurality of LC molecules (e.g., a plurality of LC molecules 320). Each of the plurality of LC molecules is a centrosymmetric nanocrystal and exhibits a size and shape dependent dipole moment. In some embodiments, each of the plurality of LC molecules is a Zinc Sulfide (ZnS) and/or Lead Sulfide (PbS) nanorod encapsulated in a liquid crystalline medium. Here, the LC cell 720a and LC cell 720b are configured to cause a phase adjustment in the polarization of the light 740 by a first amount and a second amount, respectively. In this discussion it is assumed that the light 740 is RCP.

The light 750 is light 740 whose polarization is changed by a third amount of phase adjustment, representative of the total phase adjustment caused by the stacked LC structure 700. And the total amount of phase adjustment is such that polarization of light 750 may be rotated relative to the light 740. For example, the light 750 is RCP while the light 740 is LCP. In other example embodiments, the light 750 is RCP, LCP, horizontally linearly polarized, vertically lineally polarized, or any combination thereof. The orientation of the LC cell 720a relative to the LC cell 720b is such that birefringence of the LC cell 720b compensates for any ghost image introduced to the light 740 passing through the LC cell 720a. And compensation may be such that the ghost image is mitigated or, in some cases, removed entirely from the light 750 exiting the stacked LC structure 700.

In an embodiment, the stacked LC structure 700 has a first state and a second state. In various embodiments, a state of the stacked LC structure 700 is controllable via the application of a control voltage. In an embodiment, a first voltage value configures the stacked LC structure 700 into the first state and a second voltage value configures the stacked LC structure 700 a second state. In an embodiment, in the first state, the stacked LC structure 700 polarizes an input RCP light (e.g., light 740) at wavelengths 650 nm, 550 nm, and 450 nm and input angles from −60° to 60°. For example, in a first state, the input light (e.g., light 740) is RCP and the output light (e.g., light 750) is LCP over incident polar angles from −60° to 60°. In the second state, the stacked LC structure 700 does not modify the polarization of an input light. In an example embodiment, a stacked LC structure 700 operates in a first state under the voltage applied of a first value is applied, and the stacked LC structure 700 operates in a second state when a voltage of a second value is applied.

Figure 8:
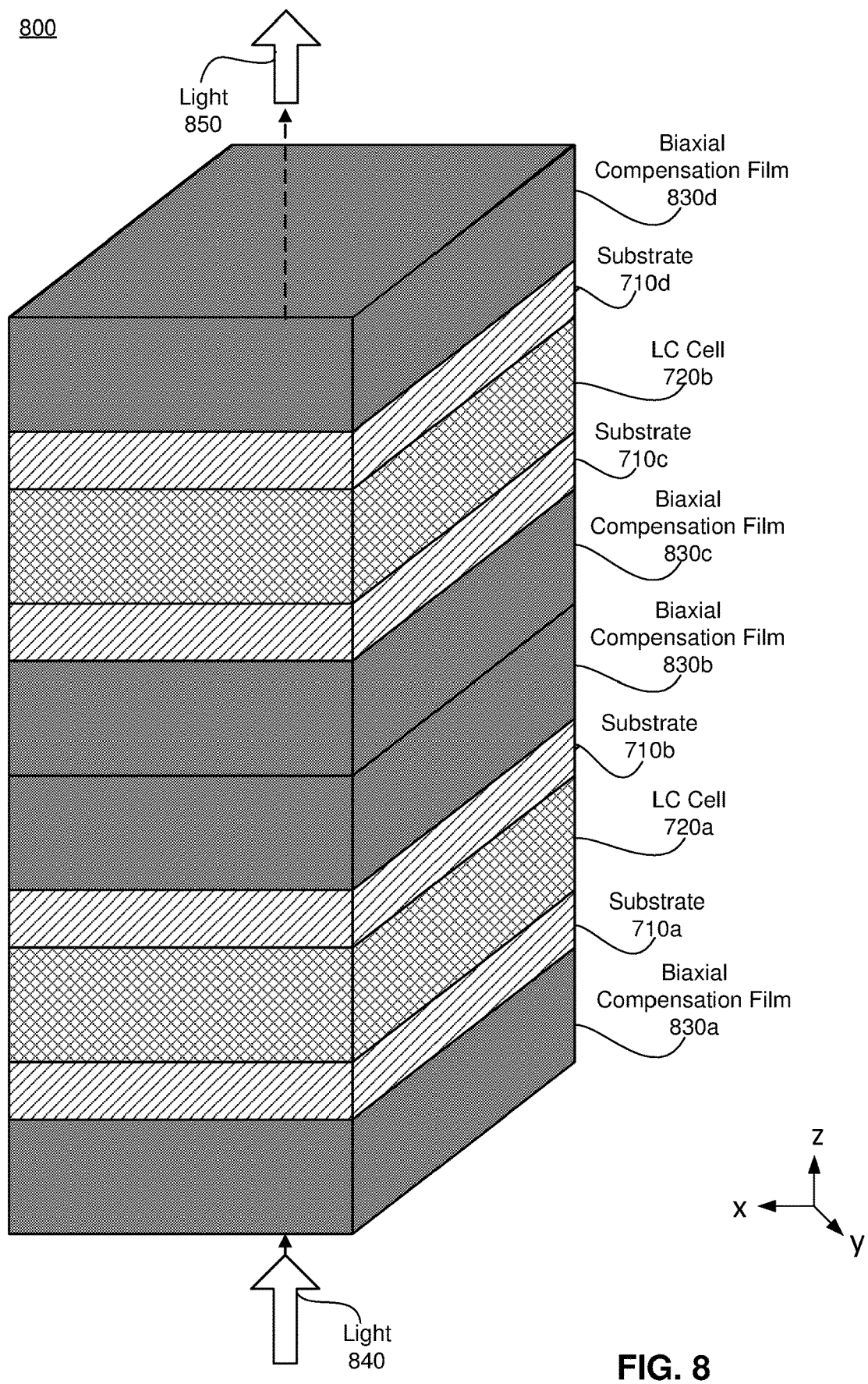
FIG. 8 is a design example of a stacked LC structure comprising two LC cells each of which is in a twisted nematic configuration and includes biaxial compensation films, in accordance with an embodiment.

FIG. 8 is an isometric view of a stacked LC structure 800 comprising two LC cells (e.g., LC cell 720a and LC cell 720b) in a twisted nematic configuration biaxial compensation films (e.g., biaxial compensation film 830a, biaxial compensation film 830b, and biaxial compensation film 830c), in accordance with an embodiment. The biaxial compensation films 830a-d are optical components with a specific angular birefringence configured to compensate the angular dependence of LC cells. In the example, embodiment of FIG. 8, the biaxial compensation films are aligned such that their birefringence is offset from one another by 90°. In various embodiments, the biaxial compensation films 830a, 830b, 830c, and 830d are plastic with a birefringence along its optical axis. In the example embodiment associated with FIG. 8 the optical axis of the biaxial compensation films 830c and the biaxial compensation films 830d are oriented such that the optical axis of one is orthogonal to that of the other. That is, in an example embodiment if the birefringence of the biaxial compensation film is 830c is orientated along the X axis, then the birefringence of the biaxial compensation film 830d is orientated along the Y axis or the Z axis. In an embodiment, each of the biaxial compensation films 830a, 830b, 830c, and 830d are comprised of poly-propylene which is extruded and stretched in two directions (e.g., along the X and Z axis). The stacked LC structure 800 also includes substrates 710a-d. The substrates 710a-d are further described in detail, above, in conjunction with FIG. 7.

In FIG. 8, the LC cell 720a is between substrate 710a and substrate 710b and LC cell 720b is between substrate 710c and substrate 710d. In FIG. 8, light 840 is incident on biaxial compensation film 830a and propagates through the stacked LC structure 800. The light 840 exits the stacked LC structure 800 as a light 850 via biaxial compensation film 830d after propagating though substrate 710a, LC cell 720a, substrate 710b, biaxial compensation film 830b, biaxial compensation film 830c, substrate 710c, LC cell 720b, substrate 710d, and biaxial compensation film 830d.

The light 850 is light 840 whose polarization is changed by an amount of phase adjustment, representative of the total phase adjustment caused by the stacked LC structure 800. And the total amount of phase adjustment is such that polarization of light 850 may be rotated relative to the light 840. For example, the light 850 is RCP while the light 840 is LCP. In other example embodiments, the light 850 is RCP, LCP, horizontally linearly polarized, vertically lineally polarized, or any combination thereof. The orientation of the LC cell 720a relative to the LC cell 720b is such that birefringence of the LC cell 720b compensates for any ghost image introduced to the light 840 passing through the LC cell 720a. And compensation may be such that the ghost image is mitigated or, in some cases, removed entirely from the light 850 exiting the stacked LC structure 800.

In an embodiment, the stacked LC structure 800 has a first state and a second state. In various embodiments, a state of the stacked LC structure 800 is controllable via the application of a control voltage. In an embodiment, a first voltage value configures the stacked LC structure 800 into the first state and a second voltage value configures the stacked LC structure 800 a second state. In some embodiments, in the input light (e.g., light 840) is RCP. In the first state, the stacked LC structure 800 polarizes input RCP light at wavelengths 650 nm, 550 nm, and 450 nm and input polar angles from −60° to 60°. In the second state, a RCP input light is converted into RCP output light at wavelengths 650 nm, 550 nm, and 450 nm and at input polar angles from −25° to 25°. In other words, the stacked LC structure 800 does not modify the polarization of input RCP polarized light in the second state. In an example embodiment, a stacked LC structure 800 operates in a first state under the voltage applied of a first value is applied, and the stacked LC structure 800 operates in a second state when a voltage of a second value is applied.

Figure 9:
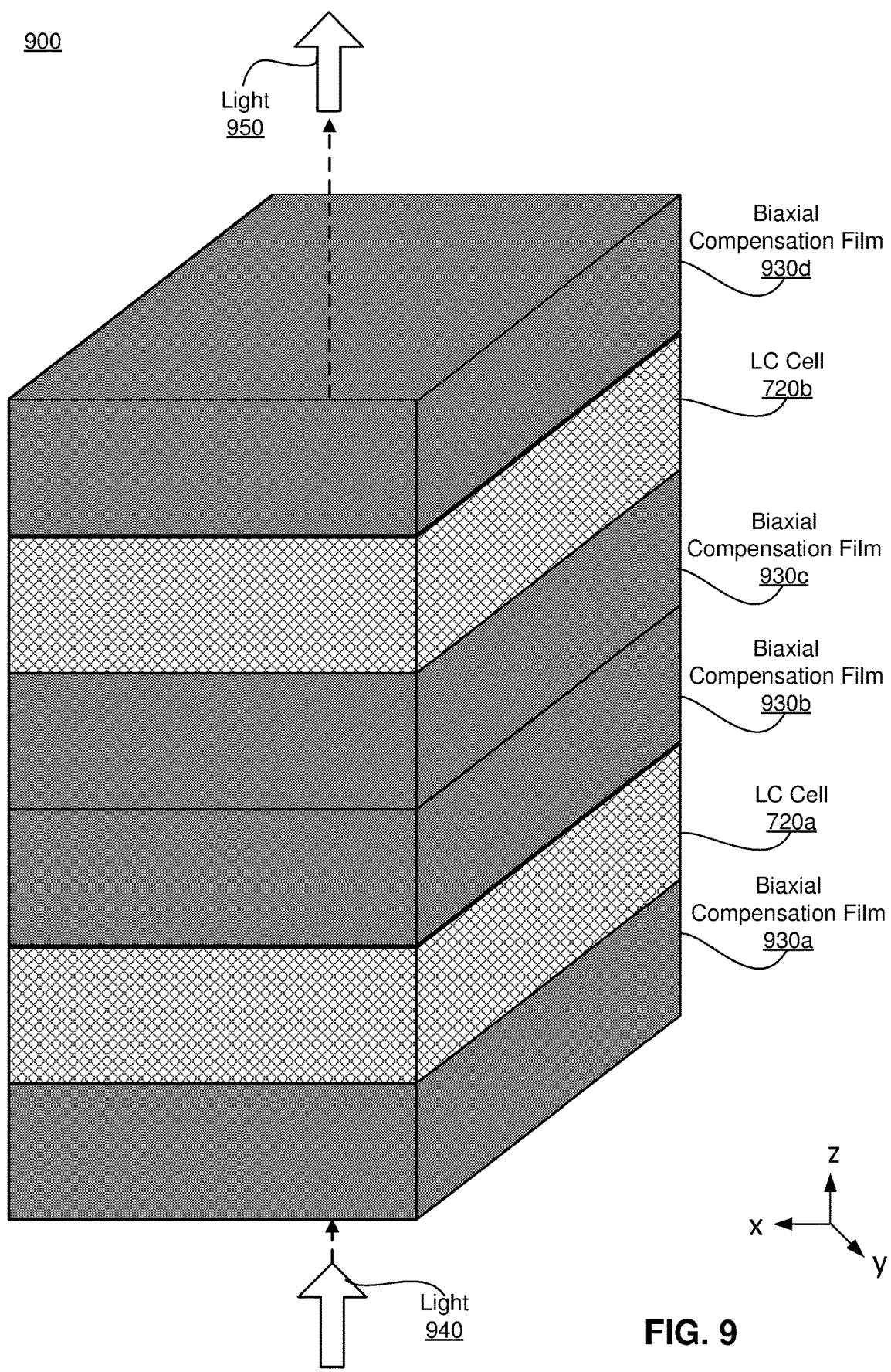
FIG. 9 is an isometric view of a stacked LC structure comprising two LC cells in a twisted nematic configuration and includes plastic film substrates, in accordance with an embodiment.

FIG. 9 is an isometric view of a stacked LC structure 900 comprising two LC cells (e.g., LC cell 720a and LC cell 720b) in a twisted nematic configuration and includes plastic film substrates, in accordance with an embodiment. The LC cell 720a is between biaxial compensation film 930a and biaxial compensation film 930b. The LC cell 720b is between biaxial compensation film 930c and biaxial compensation film 930d. In FIG. 9A, light 940 is incident on biaxial compensation film 930a and propagates through the stacked LC structure 900 via the biaxial compensation film 930a. The light 940 exits the stacked LC structure as a light 950 via biaxial compensation film 930d after propagating through LC cell 720a, biaxial compensation film 930b, biaxial compensation film 930c, LC cell 720b, and biaxial compensation film 930d. Here, biaxial compensation films 930a, 930b, 930c, and 930d are embodiments of biaxial compensation films 830a, 830b, 830c, and 830d described above in conjunction with FIG. 8.

The light 950 is light 940 whose polarization is changed by an amount of phase adjustment, representative of the total phase adjustment caused by the stacked LC structure 900. And the total amount of phase adjustment is such that polarization of light 950 may be rotated relative to the light 940. For example, the light 950 is RCP while the light 940 is LCP. In other example embodiments, the light 950 is RCP, LCP, horizontally linearly polarized, vertically lineally polarized, or any combination thereof. The orientation of the LC cell 720a relative to the LC cell 720b is such that birefringence of the LC cell 720b compensates for any ghost image introduced to the light 940 passing through the LC cell 720a. And compensation may be such that the ghost image is mitigated or, in some cases, removed entirely from the light 950 exiting the stacked LC structure 900.

In an embodiment, the stacked LC structure 900 has a first state and a second state. In various embodiments, a state of the stacked LC structure 900 is controllable via the application of a control voltage. In an example embodiment, in the first state, the input light (e.g., light 940) is RCP and the output light (e.g., light 950) is LCP. For example, in the first state, the stacked LC structure 900 polarizes input RCP light at wavelengths 650 nm, 550 nm, and 450 nm and input polar angles from −60° to 60°. In some example embodiments, in the second state, the input light is RCP and the output light is also RCP (at wavelengths 650 nm, 550 nm, and 450 nm and at input polar angles from −25° to 25°. In other words, the stacked LC structure 900 does not modify the polarization of input RCP light in the second state. In an example embodiment, a stacked LC structure 900 operates in a first state under the voltage applied of a first value is applied, and the stacked LC structure 900 operates in a second state when a voltage of a second value is applied.

Figure 10:
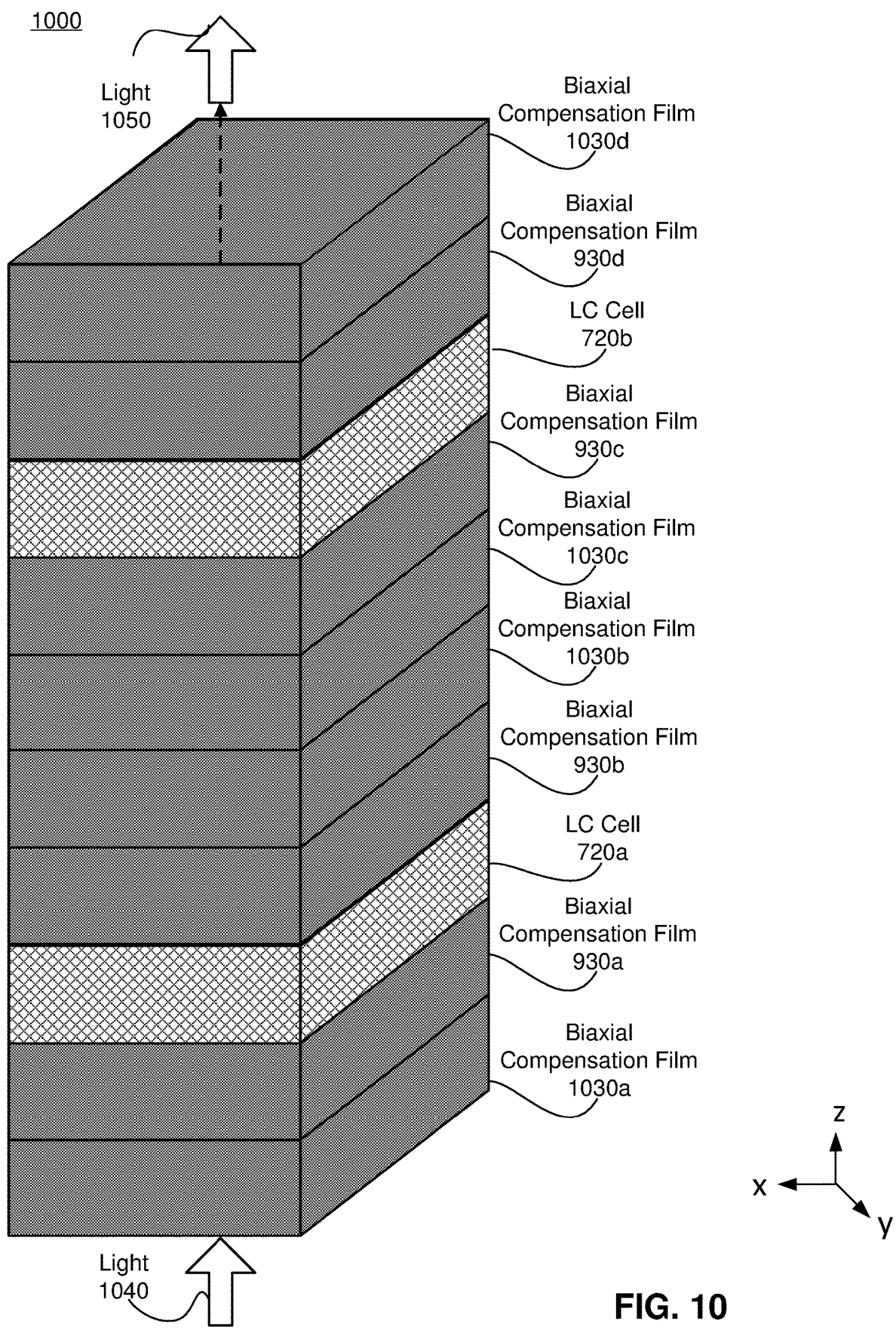
FIG. 10 is an isometric view of a stacked LC structure comprising two LC cells in a twisted nematic configuration with plastic film substrates and compensated with biaxial compensation films, in accordance with an embodiment.

FIG. 10 is an isometric view of a stacked LC structure 1000 comprising two LC cells (e.g., LC cell 720a and LC cell 720b) in a twisted nematic configuration with plastic film substrates and compensated with biaxial compensation films, in accordance with an embodiment. The LC cell 720a is between a biaxial compensation film 930a and biaxial compensation film 930b and LC cell 720b is between biaxial compensation film 930c and biaxial compensation film 930d. In FIG. 10A, light 1040 is incident on biaxial compensation film 1030a and propagates through the stacked LC structure 1000 via the biaxial compensation film 930a. The light 1040 exits the stacked LC structure 1000 as a light 1050 via biaxial compensation film 1030d after propagating through biaxial compensation film 930a, LC cell 720a, biaxial compensation film 930b, biaxial compensation film 1030b, biaxial compensation film 1030c, biaxial compensation film 930c, LC cell 720b, biaxial compensation film 930d, and biaxial compensation film 1030d. Here, the biaxial compensation film 1030a, 1030b, 1030c, and 1030d are embodiments of biaxial compensation films 830a, 830b, 830c, and 830d described above in conjunction with FIG. 8.

The light 1050 is light 1040 whose polarization is changed by an amount of phase adjustment, representative of the total phase adjustment caused by the stacked LC structure 1000. And the total amount of phase adjustment is such that polarization of light 1050 may be rotated relative to the light 1040. For example, the light 1050 is RCP while the light 1040 is LCP. In other example embodiments, the light 1050 is RCP, LCP, horizontally linearly polarized, vertically lineally polarized, or any combination thereof.

In an embodiment, the stacked LC structure 1000 has a first state and a second state. In various embodiments, a state of the stacked LC structure 1000 is controllable via the application of a control voltage. In some embodiments, in the first state, the input light (e.g., light 1040) is RCP and the output light (e.g., light 1050) is LCP. For example, in the first state, a RCP input light is converted into LCP output light at wavelengths 650 nm, 550 nm, and 450 nm and at input polar angles from −60° to 60°. In some example embodiments, in the second state, a RCP input light is converted into RCP output light at wavelengths 650 nm, 550 nm, and 450 nm and at input polar angles from −35° to 40°. In other words, the stacked LC structure 1000 does not modify the polarization of input RCP polarized light in the second state. In an example embodiment, a stacked LC structure 10000 operates in a first state a voltage of a first value is applied, and the stacked LC structure 1000 operates in a second state when a voltage of a second value is applied.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a nontransitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A stacked liquid crystal (LC) structure comprising:
    a plurality of LC cells configured to rotate a polarization of a broadband light over a range of wavelengths and a range of incident angles, the plurality of LC cells are arranged in a stack such that the broadband light passes through each of the plurality of LC cells consecutively, wherein an amount of phase adjustment caused by the plurality of LC cells stack is wavelength independent over the range of wavelengths and the range of incident angles and the plurality of LC cells are oriented relative to each other such that a cumulative rotation of the polarization for all bands of light within the broadband light is from a first polarization to a second polarization; and
    a first biaxial compensation film, a second biaxial compensation film, a third biaxial compensation film, and a fourth biaxial compensation film, wherein a first LC cell in the plurality of LC cells is located between the first biaxial compensation film and the second biaxial compensation film, a birefringence of the first biaxial compensation film is orthogonal to a birefringence of the second biaxial compensation film, a second LC cell in the plurality of LC cells is located between the third biaxial compensation film and the fourth biaxial compensation film, and the second biaxial compensation film and the third biaxial compensation film are located between the first LC cell and the second LC cell.

2. The stacked LC structure of claim 1 wherein the stacked LC structure is associated with a head mounted display (HMD).

3. The stacked LC structure of claim 1 further comprising a first state and a second state wherein in the first state the stacked LC structure changes a polarization state of the broadband light from the first polarization to the second polarization and in a second state the stacked LC structure maintains the polarization state of the broadband light.

4. The stacked LC structure of claim 3, wherein the first state is associated with a first voltage value and the second state is associated with a second voltage value.

5. The stacked LC structure of claim 4, wherein a frame rate of the stacked LC structure is dependent on the magnitude of the applied voltage.

6. The stacked LC structure of claim 1, wherein an optical mode of the stacked LC structure is selected from a group consisting of: an electrical controlled birefringence (ECB) mode, a vertical aligned (VA) mode, a multiple-domain vertical aligned (MVA) mode, a twisted nematic (TN) mode, a super twisted nematic (STN) mode, and an optical compensated (OCB) mode.

7. The stacked LC structure of claim 1, wherein at least one of the plurality of LC cells is a nematic LC cell, a nematic LC cell with chiral dopants, a chiral LC cell, a uniform lying helix (ULH) LC cell, a ferroelectric LC, or an electrically drivable birefringence material.

8. The stacked LC structure of claim 1, wherein the stacked LC cell comprises:
    a first top substrate, a first bottom substrate, a second top substrate, and a second bottom substrate configured to receive the broadband light and couple it into one of the first LC cell and the second LC cell; and
    wherein the first LC cell and the second LC cell are configured to perform a phase adjustment to the received broadband light in a broad incident angle.

9. The stacked LC structure of claim 8, wherein the first top substrate, the second top substrate, the first bottom substrate, and the second bottom substrate are each electrically conductive and optically transparent, the first top substrate and the first bottom substrate are configured to apply an electric field across the first LC cell, the second top substrate and the second bottom substrate are configured to apply an electric field across the second LC cell, and the electric field applied across the first LC cell is antiparallel to the electric field applied across the second LC cell.

10. The stacked LC structure of claim 8, wherein the stacked LC structure further includes a compensation layer including the first biaxial compensation film, wherein the compensation layer increases the range of wavelengths over which the amount of phase adjustment caused by the plurality of LC cells is wavelength independent.

11. The stacked LC structure of claim 10, wherein the compensation layer is a multi-layer birefringence film.

12. The stacked LC structure of claim 1, wherein the stacked LC structure is a switchable waveplate with a total phase retardation that is controllable through the application of an external voltage to one of the first LC cell and the second LC cell of the plurality of LC cells.

13. The stacked LC structure of claim 12, wherein the stacked LC structure is one of a quarter waveplate, a half waveplate, and a full waveplate.

14. The stacked LC structure of claim 1, wherein a field of view of the stacked LC structure is at least 60 degrees.

15. The stacked LC structure of claim 1, wherein an optical axis of the third biaxial compensation film is orthogonal to an optical axis of the fourth biaxial compensation film.

16. A stacked liquid crystal (LC) structure associated with a head mounted display, the stacked LC structure comprising:
    a plurality of LC cells configured to rotate a polarization of a broadband light over a range of wavelengths and a range of incident angles, the plurality of LC cells are arranged in a stack such that the broadband light passes through each of the plurality of LC cells consecutively, wherein an amount of phase adjustment caused by each LC cell in the plurality of LC cells is wavelength independent over the range of wavelengths and the range of incident angles and the plurality of LC cells are oriented relative to each other such that a cumulative rotation of the polarization for all bands of light within the broadband light is from a first polarization to a second polarization; and
    a first biaxial compensation film a second biaxial compensation film, a third biaxial compensation film, and a fourth biaxial compensation film, wherein a first LC cell in the plurality of LC cells is located between the first biaxial compensation film and the second biaxial compensation film, a birefringence of the first biaxial compensation film is orthogonal to a birefringence of the second biaxial compensation film, a second LC cell in the plurality of LC cells is located between the third biaxial compensation film and the fourth biaxial compensation film, and the second biaxial compensation film and the third biaxial compensation film are located between the first LC cell and the second LC cell; and
    a controller configured to:
        determine that a failure has occurred in the first LC cell, and apply a voltage to the second LC cell in order to drive the stacked LC structure.

17. The stacked LC structure of claim 16, wherein the stacked LC cell comprises:
    a first top substrate, a first bottom substrate, a second top substrate, and a second bottom substrate configured to receive the broadband light and couple it into one of the first LC cell and the second LC cell; and
    wherein the first LC cell and the second LC cell are configured to perform a phase adjustment to the received broadband light.

18. The stacked LC structure of claim 17, wherein the first top substrate, the second top substrate, the first bottom substrate, and the second bottom substrate are each electrically conductive and optically transparent.

19. The stacked LC structure of claim 17, wherein the first top substrate and the first bottom substrate are further configured to apply an electric field across the first LC cell, the second top substrate and the second bottom substrate are configured to apply an electric field across the second LC cell, and the electric field applied across the first LC cell is antiparallel to the electric field applied across the second LC cell.

20. The stacked LC structure of claim 17, wherein the stacked LC structure further includes a compensation layer including the first biaxial film, wherein the compensation layer increases the range of wavelengths over which the amount of phase adjustment caused by the plurality of LC cells is wavelength independent.

* * * * *